United States Patent [19]
Ivanovich et al.

[11] Patent Number: 5,856,675
[45] Date of Patent: Jan. 5, 1999

[54] METHOD OF IRRADIATION OF POLYMER FILMS BY AN ELECTRON BEAM

[75] Inventors: Batskikh Gennady Ivanovich; Vinogradov German Alexandrovich; Denisjuck Sergei Vladimirovich; Klionov Gennady Ivanovich, all of Moscow, Russian Federation

[73] Assignee: Biosterile Technology, Inc., Fort Wayne, Ind.

[21] Appl. No.: 987,266

[22] Filed: Dec. 9, 1997

[51] Int. Cl.$^6$ .................................................. B29C 71/04
[52] U.S. Cl. ........................................................ 250/492.3
[58] Field of Search ........................................ 250/492.3

[56] References Cited

U.S. PATENT DOCUMENTS

| | | |
|---|---|---|
| 3,679,930 | 7/1972 | Colvin et al. . |
| 3,780,308 | 12/1973 | Nablo . |
| 4,597,920 | 7/1986 | Golike . |
| 4,617,241 | 10/1986 | Mueller . |
| 4,642,244 | 2/1987 | Tripp et al. ........................ 250/492.3 |
| 4,652,763 | 3/1987 | Nablo . |

FOREIGN PATENT DOCUMENTS

| | | |
|---|---|---|
| 1 1 99 567 | 1/1986 | Canada . |
| 0 204 084 | 12/1986 | European Pat. Off. . |
| 36 02 865 | 8/1987 | Germany . |
| 955863 | 5/1980 | U.S.S.R. . |
| 1195885 | 5/1984 | U.S.S.R. . |

OTHER PUBLICATIONS

James F. Kinstle, Radiation Curing of Polymeric Materials, Chapter 2, "Electron–Beam Curing of Polymeric Materials" (American Chemical Society), 1990.
Adolphe Chapiro, Radiation Chemistry of Polymeric Systems (Intersciences Publishers) pp. V–XVI, 1962.

Primary Examiner—Jack I. Berman
Attorney, Agent, or Firm—George Pappas

[57] ABSTRACT

The invention pertains to the area of radiation production process, specifically to the technology of radiation modification of organic materials and may be used for the creation of production lines for the manufacture of radiation-modified polymer films.

The method of irradiating polymer films by an electron beam comprises a two-stage application of an accelerated electron beam on sections of moving polymer film until the preset radiation dose has been absorbed. The duration of the set time interval between the end of treatment Stage one and the beginning of treatment Stage two of the initially irradiated film section is no less than 500 msec. The set dose accumulated by each section of the film in Stage one is sufficient to alter the polymer film material from a free molecular state to a cross-linked state characterized by the formation of 3-dimensional molecular structures having a greater molecular mass.

The length of the time interval between the end of irradiation Stage one and the beginning of Stage two may be set at 1 sec.

The dose selected for absorption by the film sections during the irradiation of the polyethylene film may range from 20 to 30 kGy.

For two-stage irradiation of polymer film an electron accelerator may be used having two foil windows to extract the electron beam from the accelerator vacuum chamber.

This method being submitted for patent makes it possible to improve the physical and mechanical properties of polymer films under radiation modification by more effective use of irradiating electron energy.

8 Claims, 3 Drawing Sheets

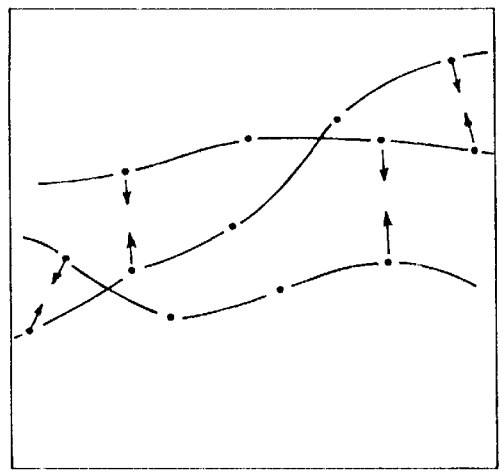
FIG_1
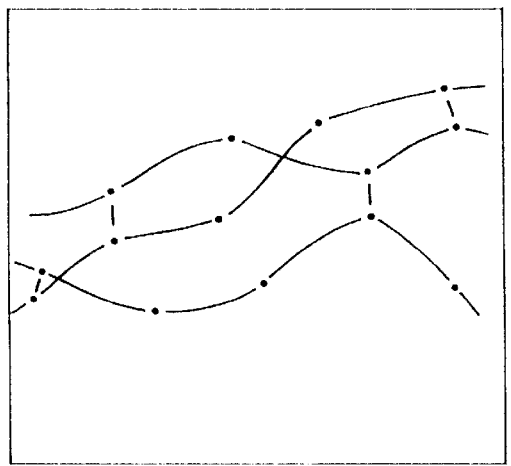
FIG_2
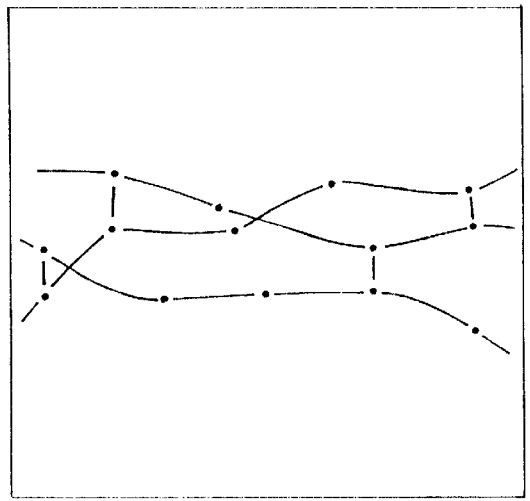
FIG_3

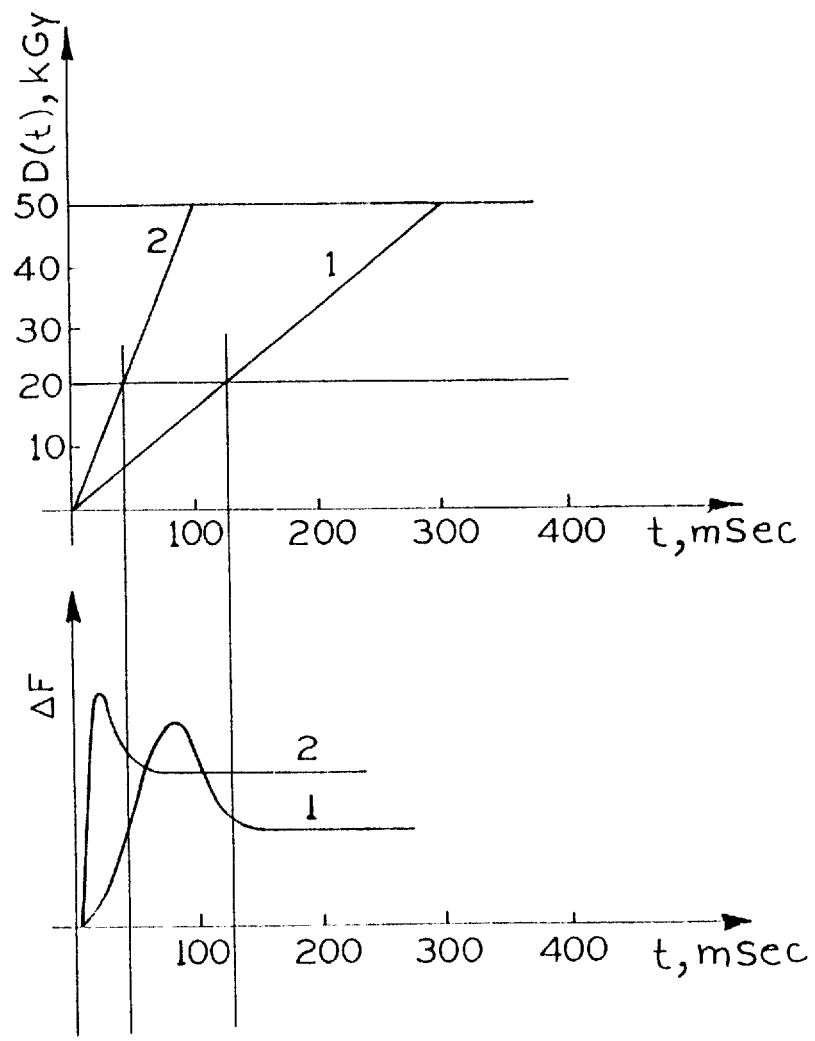
FIG_4

METHOD OF IRRADIATION OF POLYMER FILMS BY AN ELECTRON BEAM

AREA OF TECHNOLOGY

The invention pertains to the area of radiation technology, specifically to the technology of organic materials radiation modification. It may be used to set up a production line for the manufacture of radiation modified polymer films.

BACKGROUND OF INVENTION

At the present time a number of methods are known for irradiating polymer films by electron beam (E-beam) for purposes of organic materials radiation modification.

Thus, for example, there is a method of E-beam irradiation of polyurethane polymers for polyurethane stress relaxation, the E-beam produced by a high voltage accelerator. This method consists in material radiation treatment, the radiation dose ranging up to 12 Mrad as disclosed in E P, A2, 0 204 084, B29C 71/04, published in 1986.

Another E-beam radiation method is used for the removal of residual monomer from wrapper films. This method consists in low energy electron irradiation of the moving film, using a wide exit window with an irradiation dose from ds50 kGy as disclosed in DE,A1, 3 602 965, B29C 71/04, published in 1987, accelerating voltage magnitude ranging from 150–300 kV.

The closest known analogue to the proposed invention is the method of irradiating polymer films by E-beam, which includes treatment of moving polymer film by means of accelerated electrons with an accelerating voltage of 400–750 KeV to effect film crosslinking. The speed at which film moves past the opening of the scanning device is 3.5–5 m/min with a film radiation dose of 10–16 Mrad as disclosed in SU, A, 955 863, B29C 7104, published in 1982.

The drawback of this closest analogue to the invention, as well as the other analogues mentioned above, is the inefficient energy usage of electrons irradiating polymer film in order to modify its properties. For single-stage polymer material irradiation up to full radiation dose, linear molecules crosslinked into a 3-dimensional structure fail to achieve optimal spatial configuration with the minimum of free energy. A worsening of the physical and mechanical properties of crosslinked polymer film results.

BRIEF SUMMARY

The basic intent of the invention submitted for patent is to improve polymer film properties through radiation modification by means of a more efficient usage of electron radiation energy.

This process result is achieved as follows: in the present polymer film irradiation method, including the effect of the accelerated electron beam on the moving section of polymer film before preset radiation dose is attained, the dose of radiation is administered in 2 successive stages. The time interval selected between the completion of processing stage 1 of each section of film and the commencement of processing stage 2 of the section of film initially irradiated amounts to no less than 500 msec, and the dose to be absorbed by each section of film during irradiation stage 1 is selected sufficient to alter film polymer material from a free-molecular state to a crosslinked state characterized by the formation of a 3-dimensional dimensional molecular structure possessing a higher molecular mass.

A time interval equal to one second may be selected.

In the irradiation of polyethylene films it is advisable to select a dose for absorption by the film in radiation stage 1 in the range of 20 to 30 kGy.

In order to perform a 2-stage radiation process on moving polymer film it is desirable to utilize an electron accelerator having 2 foil windows for extraction of the electron beam from the accelerator vacuum chamber.

BRIEF DESCRIPTION OF DRAWINGS

The method of irradiating polymer films by electron beam to be patented is elucidated following drawings.

Diagram showing spatial condition of polyethylene molecular structure under initial electron radiation (carbon atoms represented by dots).

FIG. 2. Diagram showing spatial condition of polyethylene molecular structure 1 msec after commencement of irradiation (carbon atoms represented by dots).

FIG. 3. Diagram showing spatial condition of polyethylene molecular structure 500 msec after commencement of radiation (carbon atoms represented by dots).

FIG. 4. Graph showing the temporal relationship between the change in free energy $\Delta F(t)$ of a polymer system (in relative units of measure) and radiation dose $D(t)$ (in kGy), absorbed by polyethylene film in single-stage irradiation.

DETAILED DESCRIPTION OF THE INVENTION

Figure 5:
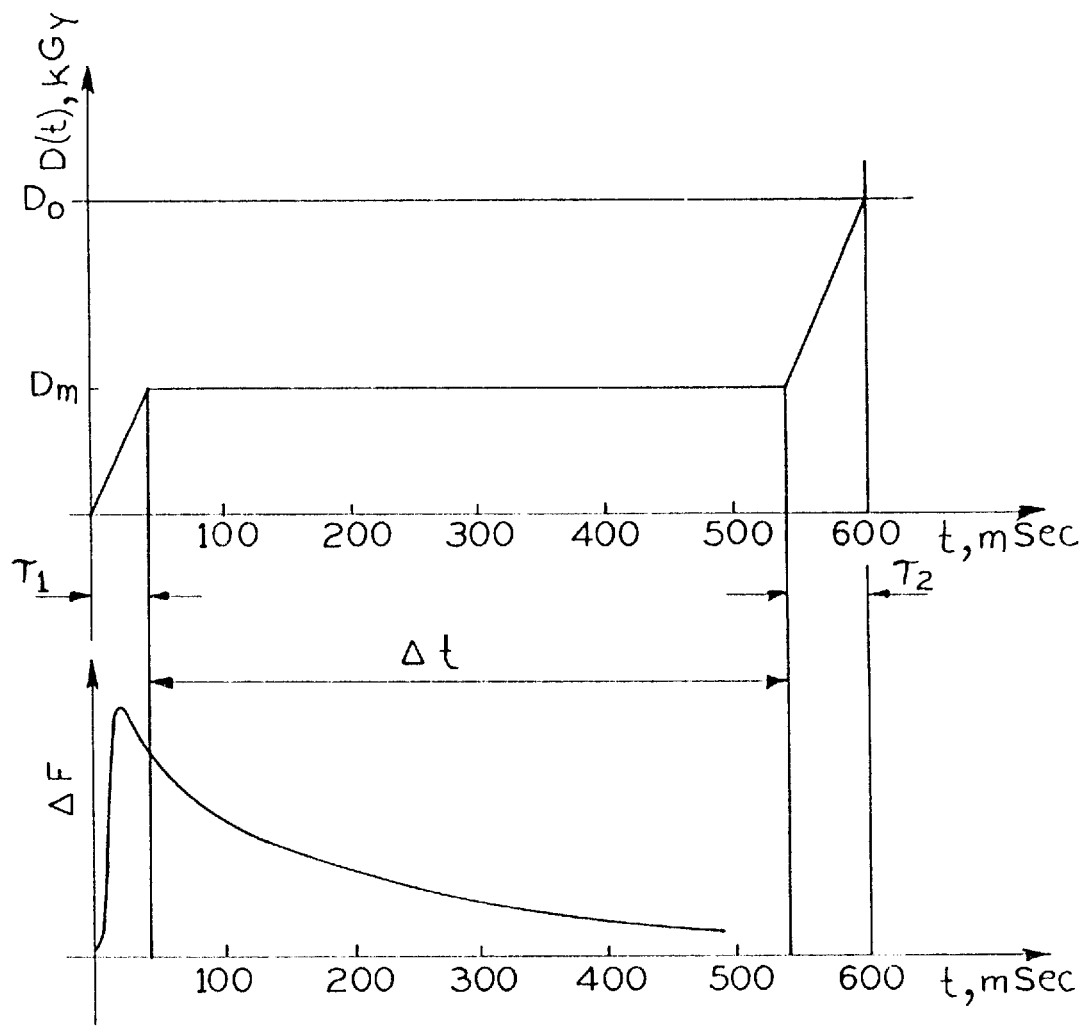
FIG. 5. Graph showing the temporal relationship between the change in free energy $\Delta F(t)$ of a polymer system (in relative units of measure) and radiation dose $D(t)$ (in kGy), absorbed by polyethylene film in 2-stage irradiation.

The method submitted for patent of irradiating polymer films includes the following operations:

Moving the polymer film to be irradiated in a given direction by means of a conveyor of any known design.

Initial treatment (radiation stage 1) by a beam of accelerated electrons on a section of moving polymer film until sufficient radiation dose has been absorbed by the polymer film material to alter it from a free molecular state to a crosslinked state, characterized by the formation of 3-dimensional molecular structures with a higher molecular mass.

Follow-up treatment (radiation stage 2) by a beam of accelerated electrons on each previously irradiated section of the polymer film, until preset radiation dose has been fully absorbed, over a time interval no less than 500 msec. in duration.

In this particular example of the application of the invention for radiation modification of polyethylene film the recommended absorption dose for the portion of film in radiation stage 1 is 20–30 kGy.

The length of the time interval between the conclusion of polyethylene film radiation stage 1 and the commencement of radiation stage 2 is equivalent to 1 second.

For polymer material from which film is manufactured by the present method of radiation modification treatment a wide range of crosslinking polymer systems, such as polyolefins, polyacrylates, and other linear crosslinking molecular structures, may be used.

As for the means of providing the two-stage radiation by accelerated electrons of polymer film (in the example under consideration polyethylene) separated by a time interval, any currently known electron accelerator may be utilized.

Thus, for instance, two electron accelerators may be used for the two-stage irradiation of polymer film, placed one after the other over the length of the moving film, with the exit foil windows positioned above the surface of the film sections to be irradiated (see SU, A 727 087, H05H 5/00, G21H 5/00, published in 1983, FIG. 2).

More efficient from the standpoint of conservation of material and energy resources would be the option of using a single electron accelerator constructed so as to permit two-stage irradiation of polymer film US, A 3 679 930, H01J 29/76, published in 1972. In contrast to other types of electron accelerators this accelerator US, A, 3 679 930, H01J 29/76, published in 1972 features two foil windows for the extraction of electrons from the vacuum chamber. Placing the accelerator's foil windows above the moving film thus makes possible a sequential two-stage radiation of film with the preset time interval in between.

The invention submitted for patent is predicated on the following experimental and theoretical bases.

Research into the structural changes and properties of irradiated polymer films, based on the example of polyethylene, has made it possible to identify clearly defined stages through which polymer passes as the dose increases.

In the initial radiation stage, at approximately 20–30 kGy, cross co-valence linking occurs between the individual carbon atoms comprising the linear molecules along with generation of 3-dimensional spatial polymers possessing a higher molecular mass. The properties acquired in this stage by the polymer are determined not so much by newly arising rigid bonds/links formed by a ramified molecular system, as by cross-molecular interaction between these systems which makes possible their mutual displacements and deformations in the presence of external mechanical influences. Under such conditions polyethylene comes to closely resemble in its properties rubber-like materials.

As the dose increases the density of crosslinking increases and the polyethylene structure is transformed into a unified spatial network. As a result the material assumes useful new properties: increased modulus of elasticity, increased tensile strength, resilience to influences of chemicals and temperature.

In the third stage, approximately 300 kGy and above, polyethylene begins to change into a solid glasslike substance of no interest for the film modification process.

The presence of the stages mentioned above in the dose absorption process offers a basis for investigating the kinetics of the transformations arising in the individual stages. Polymer material may be viewed as a complex system consisting of two interacting subsystems: electron-chemical and nuclear-molecular, forming a definite compound structure. It is precisely under these conditions that the non-inertial electron-chemical subsystem absorbs the irradiation energy and is instantaneously modified according to the dose absorbed by spatial redistribution of electron links; the inertial nuclear subsystem, however, accepts these changes and adjusts to them only after a substantial delay.

In a simplified form the response of the polymer system is the consequence of the following two processes.

FIG. 1 shows a displacement of carbon atoms, between which cross-linkages have arisen, to new equilibrium parameters corresponding to a minimum of energy in the sector where these cross-linked states are localized. The characteristic relaxation time of this process has virtually nothing to do with the accumulated dose, though it does depend to a small degree to the structure of the material and is equal to approximately 1 msec.

FIG. 2 shows a change in the configuration of the molecular chains, tied in with the minimization of energy in the overall conformation space. This process is initiated following the process of local carbon atom displacements and includes a part of the structural rearrangement of the system caused by the formation and extraction beyond the matrix limits of free products of radiolysis, for example, molecular hydrogen during the irradiation of polyethylene.

This part of the structural rearrangement occurs only in radiation stage 1 when the polymer system is not yet cross-linked and consists of a structure of moveable ramified polymer molecules (see FIG. 2).

An analysis of the experimental data for cross-linking polymer materials indicates that the structural rearrangement of the system, connected with the effect of conformational adjustment, last from 500 msec. to 2 sec., depending on external conditions (temperature, mechanical loads, etc.)

Thus the minimum time from the commencement of irradiation of the polymer film to the conclusion of conformation system adjustment is equal to 500 msec.

When the radiation dose is increased until a fully cross-linked structure of polymer material is formed (see FIG. 3), the processes connected with conformation adjustment are practically nonexistent; instead the newly arisen cross-links fix and reinforce the structure formed earlier.

In single-stage irradiation of polymer film the full irradiation dose $D_0$ is absorbed much more rapidly than necessary to achieve optimal system configuration with the minimum amount of free energy F.

For example, in single-stage irradiation of polyethylene film with a film conveyor speed of 10 m/min. across an accelerator foil exit window 0.05 m in width the exposure time for full irradiation dose $D_0$ shall be 300 msec. During this time, with a selected electron beam current value, a preset film irradiation dose of 50 kGy is accumulated (see FIG. 4, curve 1).

The irradiation process may be intensified by increasing the electron beam current, for instance, by a factor of 3. In this case the preset dose (50 kGy) will accumulate in 100 msec (see FIG. 4, curve 2). In the example under consideration (see FIG. 4), that of single-stage film irradiation, the dose value $(D_{mol})$=20 kGy corresponds to the transition threshold of polyethylene from a free molecular state to a cross-linked state characterized by the formation of 3-dimensional molecular structures with a greater molecular mass. After the accumulation of the indicated irradiation dose (after 120 msec. for curve 1 and 30 msec. for curve 2 respectively-see FIG. 4) the process of relaxation of free energy F ceases and the polyethylene is cross-linked into a spatial structure with residual free energy F, which is greater in proportion to the intensity of the radiation process (see FIG. 4 where curve 1 relation of F(t) corresponds to curve 1 relation D(t), and curve 2 F(t) to curve 2 D(t)).

In the polymer film irradiation method submitted for patent a two-stage irradiation scheme is used for the cross-linking of polymer systems (see FIG. 5), which is better adapted to the internal kinetics of the processes.

Irradiation stage 1 of this method is concluded by the formation of a ramified molecular structure (see FIG. 2) under the irradiation dose accumulated over the course of time interval $\pi_1$. A dose $D_{mol}$ absorbed by every section of the film in irradiation stage 1 is selected sufficient to effect the transformation of the polymer material from a free molecular state to a cross-linked state characterized by the formation of 3-dimensional molecular structures having a greater molecular mass. In the example under consideration the dose $D_{mol}$ equals 20 kGy.

Upon expiration of time interval $\Delta t$ (after conclusion of stage 1) necessary for the relaxation of system's free energy F, arising during first irradiation dose $D_{mol}$, irradiation stage 2 follows during time interval $\pi_2$ until total radiation dose has been absorbed sufficient to effect complete cross-linking of the polymer structure into a unified spatial network.

In order to implement the method submitted for patent the following conditions must be present to ensure optimal irradiation energy use so as to obtain the specified properties of polymer film:

$$\Delta\tau \geq 500 \text{ msec}; R_0 \times \tau_1 \geq D_{mol}, R_0 \times (\tau_1+\tau_2)=D_0,$$

where $R_0$=irradiation dose rate (Gy/sec.)

From the relations plotted in the graph (FIG. 5) it can be seen that at the moment irradiation stage 2 is complete the polymer system has succeeded in dumping free energy F and by this means has become cross-linked into a more optimal spatial configuration. This phenomenon ensures overall a more efficient use of electron energy for irradiation and improves the physical and mechanical properties of irradiated polymer films-an example of the technical result attainable by the invention.

The invention being submitted for patent is designed for use in a radiation production process and may be utilized for the modification of organic materials, particularly polymer films.

The invention may be used for the development of maximum efficiency production lines for the manufacture of radiation modified polymer films.

A broad range of cross-linking polymer materials may be subjected to radiation, such as polyolefins, polyacrylates, and other linearly cross-linking structures.

We claim:

1. Method for irradiating polymer films and transforming the polymer film material from a free molecular state to a cross-linked state, comprising the modification by a beam of accelerated electrons of sections of moving polymer film until preset irradiation dose has been absorbed, the method is characterized by sequential, two-stage irradiation; the length of the time interval between the conclusion of processing stage 1 of each film part and the commencement of processing stage 2 of the previously irradiated film part is set at no less than 500 msec. and the selected dose absorbed by every part of the film in irradiation stage 1 is sufficient to effect the transformation of polymer film material from a free molecular state to a cross-linked state, characterized by the formation 3-dimensional molecular structures with a greater molecular mass.

2. The method, according to claim 1, characterized by a selected time interval between the conclusion of irradiation stage 1 and the commencement of stage 2 of 1 sec.

3. The method, according to claim 1, is distinguished by a selected dose in stage 1 of 20 to 30 kGy for the irradiation of polyethylene film.

4. The method, according to claim 1, is distinguished by the use of an electron accelerator with two foil windows for the extraction of the electron beam from the accelerator vacuum chamber for the two-stage irradiation of polymer film.

5. A method of irradiating moving polymer film with accelerated electrons until a preset total irradiation dose has been absorbed by the moving polymer film and the polymer film material is transformed from a free molecular state to a cross-linked state, the method characterized by:

irradiating the moving polymer film with accelerated electrons at a first stage;

irradiating the moving previously irradiated polymer film with accelerated electrons at a second stage;

wherein the length of time between the conclusion of the irradiating at stage one and the commencement of irradiating at stage two is not less than 500 milliseconds; and, wherein the irradiating, dose absorbed by the moving polymer film at stage one is sufficient to effect the transformation of polymer film material from a free molecular state to a cross-linked state characterized by the formation of three dimensional molecular structures with a greater molecular mass.

6. The method of irradiating moving polymer film of claim 5, wherein the length of time between the conclusion of the irradiating at stage one and the commencement of irradiating at stage two is not less than 1 second.

7. The method of irradiating moving polymer film of claim 5, wherein the irradiating dose absorbed by the polymer film at stage one is between 20–30 kGy.

8. The method of irradiating moving polymer film of claim 5, wherein an electron accelerator with two foil windows for the extraction of the electron beam from an accelerator vacuum chamber is used for providing accelerated electrons and irradiating the polymer film at both said first and second stages.

* * * * *

UNITED STATES PATENT AND TRADEMARK OFFICE
CERTIFICATE OF CORRECTION

PATENT NO. : 5,856,675
DATED : January 5, 1999
INVENTOR(S) : Ivanovich, et al.

It is certified that error appears in the above-identified patent and that said Letters Patent is hereby corrected as shown below:

```
Col. 1, line 24, change "ds50" to --50--.
Col. 1, line 24, change "965" to --865--.
Col. 2, line 8, add "FIG. 1" before "Diagram".
Col. 4, line 53, change "π₁" to --τ₁--.
Col. 4, line 60, change "At" to --Δt--.
Col. 4, line 63, change "π₂" to --τ₂--.
```

Signed and Sealed this

Thirteenth Day of April, 1999

Attest:

Q. TODD DICKINSON

Attesting Officer

Acting Commissioner of Patents and Trademarks